United States Patent
Sakata et al.

(10) Patent No.: US 10,343,715 B2
(45) Date of Patent: Jul. 9, 2019

(54) POWER STEERING ADJUSTMENT DEVICE

(71) Applicant: Mitsubishi Electric Corporation, Tokyo (JP)

(72) Inventors: Reiko Sakata, Tokyo (JP); Yoshimichi Umeki, Tokyo (JP); Tsutomu Matsubara, Tokyo (JP); Yoshiki Ono, Tokyo (JP); Hiroaki Kitano, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 15/545,397

(22) PCT Filed: Jul. 15, 2015

(86) PCT No.: PCT/JP2015/070260
§ 371 (c)(1),
(2) Date: Jul. 21, 2017

(87) PCT Pub. No.: WO2017/009968
PCT Pub. Date: Jan. 19, 2017

(65) Prior Publication Data
US 2018/0118258 A1    May 3, 2018

(51) Int. Cl.
*B62D 5/04*    (2006.01)
*B62D 6/00*    (2006.01)

(52) U.S. Cl.
CPC .......... *B62D 6/007* (2013.01); *B62D 5/0466* (2013.01); *B62D 6/00* (2013.01); *B62D 6/008* (2013.01); *B62D 5/0463* (2013.01)

(58) Field of Classification Search
CPC ........ B62D 6/007; B62D 5/0466; B62D 6/00; B62D 6/008; B62D 5/0463
See application file for complete search history.

(56) References Cited

U.S. PATENT DOCUMENTS 7,974,751 B2 * 7/2011 Ito .................. B62D 5/0463
701/41
2002/0087241 A1    7/2002 Nakano et al.
(Continued)

FOREIGN PATENT DOCUMENTS

JP    2949293 B2    9/1999
JP    2000-003206 A    1/2000
(Continued)

OTHER PUBLICATIONS

International Search Report of PCT/JP2015/070260, dated Oct. 6, 2015 (PCT/ISA/210).
Japanese Office Action for 2016-528251 dated, Jun. 28, 2016.

*Primary Examiner* — Joseph M Rocca
*Assistant Examiner* — Michael R Stabley
(74) *Attorney, Agent, or Firm* — Sughrue Mion, PLLC; Richard C. Turner (57) ABSTRACT

When an adjustment information input unit (1) acquires one of information of a feeling value and steering control information, a steering control information calculation unit (2) calculates data of a control characteristic graph visually representing control characteristics of steering using the acquired information. An adjustment information display unit (3) displays, on the same screen, a control characteristic graph in accordance with the data of the control characteristic graph and a feeling value operation section visually showing the feeling value.

7 Claims, 10 Drawing Sheets

(56) References Cited

U.S. PATENT DOCUMENTS

| | | | |
|---|---|---|---|
| 2002/0143449 A1 | 10/2002 | Yasuda | |
| 2005/0065685 A1* | 3/2005 | Hamamoto | B62D 5/0466 |
| | | | 701/41 |
| 2005/0140322 A1* | 6/2005 | Itakura | B60G 17/016 |
| | | | 318/466 |
| 2006/0006021 A1* | 1/2006 | Takimoto | B62D 6/008 |
| | | | 180/446 |
| 2006/0080016 A1* | 4/2006 | Kasahara | B62D 5/006 |
| | | | 701/41 |
| 2009/0312909 A1* | 12/2009 | Onuma | B62D 6/007 |
| | | | 701/41 |

FOREIGN PATENT DOCUMENTS

| | | |
|---|---|---|
| JP | 2002-089352 A | 3/2002 |
| JP | 2002-173042 A | 6/2002 |
| JP | 2002-293257 A | 10/2002 |
| JP | 2005-225430 A | 8/2005 |
| JP | 3785445 B2 | 6/2006 |
| JP | 2015-009644 A | 1/2015 |

* cited by examiner

FIG.10

# POWER STEERING ADJUSTMENT DEVICE

CROSS REFERENCE TO RELATED APPLICATIONS

This application is a National Stage of International Application No. PCT/JP2015/070260 filed Jul. 15, 2015, the contents of all of which are incorporated herein by reference in their entirety.

TECHNICAL FIELD

The present invention relates to a power steering adjustment device used for adjusting electric power steering (EPS).

BACKGROUND ART

In EPS in general, steering control is adjusted in a development process of a vehicle in accordance with development objects such that steering feeling of a steering wheel is optimized for a driver of the vehicle.

As an example of such an adjusting device, there is a technique in which a required editing amount is grasped as an intuitive or a sensuous amount by performing edit on a steering characteristic chart with visual checking of the steering characteristic chart, and steering feeling is reconfigured to match development objects of the vehicle in the development process or individual characteristics of a driver (e.g. see Patent Literature 1).

In another technique, various kinds of steering feeling are obtained to match individual characteristics of a driver by editing and storing operation characteristics by clicking on or drawing a steering characteristic chart using a group of operation switches with visually checking steering characteristics displayed on a steering characteristics screen of a display device (e.g. see Patent Literature 2).

In still another technique, a data base representing relation between control parameter data and steering feeling is configured, and a method for adjusting a control parameter to obtain desired operation feeling is presented (e.g. see Patent Literature 3).

CITATION LIST

Patent Literature

Patent Literature 1: JP 2005-225430 A
Patent Literature 2: JP 2002-293257 A
Patent Literature 3: JP 2002-173042 A

SUMMARY OF INVENTION

Technical Problem

In the techniques described in the Patent Literatures 1 and 2, however, adjustment is performed by graph editing and selecting regarding steering control of a compensating current or a motor compensating current and thus it is required to adjust a plurality of graphs repeatedly in order to implement desired steering feeling, which disadvantageously takes time for adjustment. There is also a disadvantage that adjustment requires cooperation by a specialist experienced in driving who understands a shape of the graph regarding steering feeling such as a professional driver.

In the adjusting method of the related art described in Patent Literature 3, only a method for adjusting a control parameter is described. Thus, a person unfamiliar with adjustment work requires much time for adjustment, which does not solve the disadvantage that adjustment takes time.

The invention is devised in order to solve the above disadvantages, and an object of the present invention is to provide a power steering adjustment device by which a person who is not skilled in the adjustment work can perform adjustment and the time for adjustment can be reduced.

Solution to Problem

A power steering adjustment device according to the present invention includes: an adjustment information input unit acquiring at least one of information of a feeling value representing steering feeling of a steering wheel of a vehicle and steering control information representing control information of assist power of steering; a steering control information calculation unit calculating data of at least one control characteristic graph visually representing control characteristics of steering using the at least one of information acquired by the adjustment information input unit; and an adjustment information display unit displaying the at least one control characteristic graph in accordance with the data of the at least one control characteristic graph and a feeling value operation section visually showing the feeling value on a same screen. The feeling value is obtained from relation between a steering angle and steering torque in the steering control information.

Advantageous Effects of Invention

According to a power steering adjustment device according to the present invention, a control characteristic graph visually showing control characteristics of steering and a feeling value operation section visually showing feeling values are displayed on the same screen. As a result, a person not skilled in adjustment work can also perform adjustment, and the time for adjustment can be reduced.

DESCRIPTION OF EMBODIMENTS

In the following, to describe the invention further in detail, some embodiments for carrying out the present invention will be described with reference to the accompanying drawings.

First Embodiment

Figure 1:
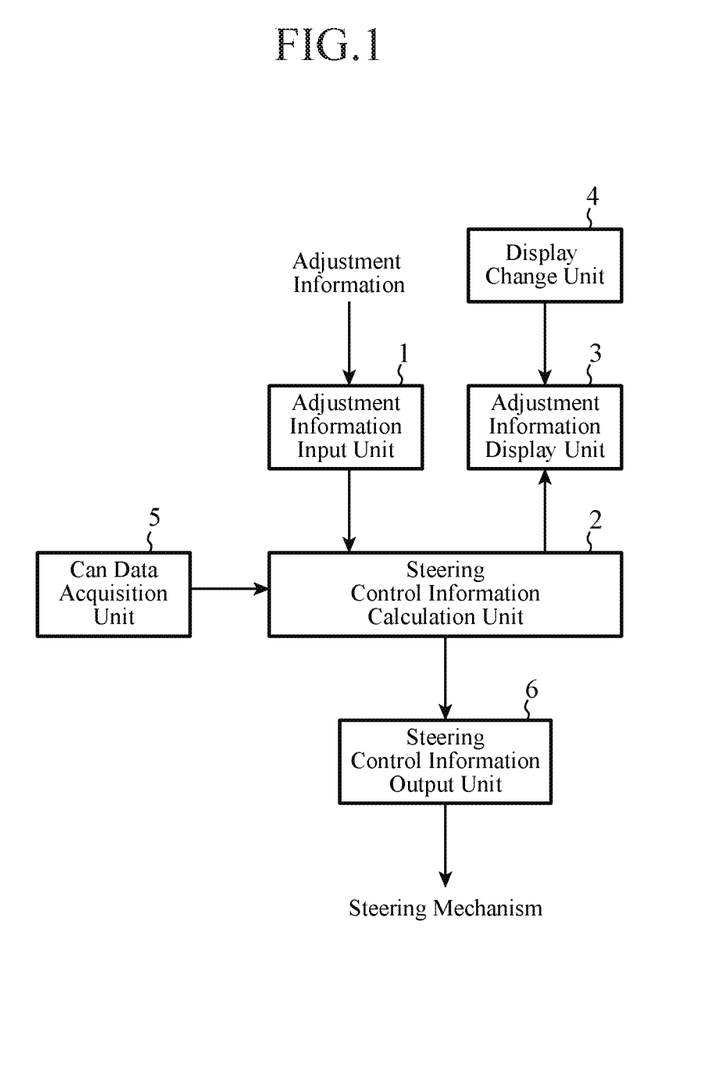
FIG. 1 is a configuration diagram illustrating a power steering adjustment device according to a first embodiment of the present invention.

FIG. 1 is a configuration diagram illustrating a power steering adjustment device of this embodiment.

The power steering adjustment device according to this embodiment includes an adjustment information input unit 1, a steering control information calculation unit 2, an adjustment information display unit 3, a display change unit 4, a CAN data acquisition unit 5, and a steering control information output unit 6 as illustrated in FIG. 1.

The adjustment information input unit 1 is a processing unit that accepts, as adjustment information, input of at least one of information of a feeling value representing steering feeling that an operator feels when operating a steering wheel of a vehicle and steering control information representing control information of motor assist power in an electric power steering device. FIGS. 2A, 2B, 3A, and 3B are diagrams illustrating a feeling value operation section in the adjustment information input unit 1.

Figure 2A:
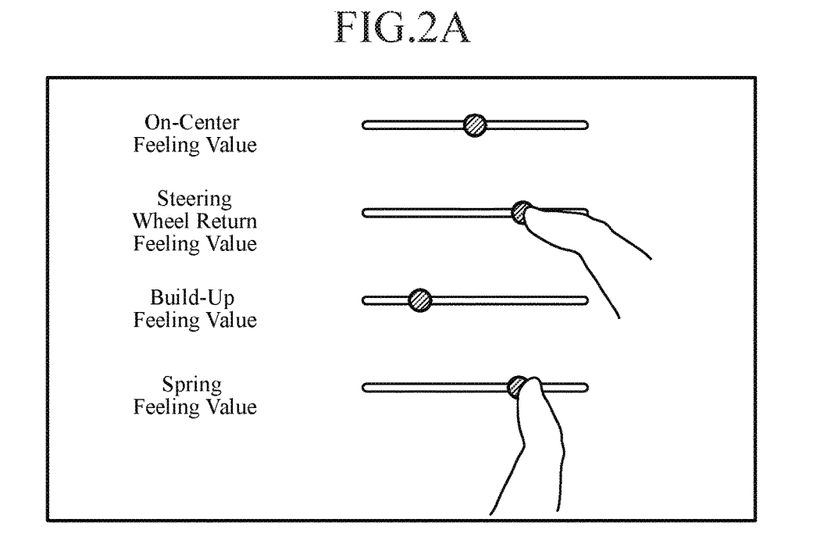
FIGS. 2A and 2B are explanatory diagrams illustrating a feeling value operation section in an adjustment information input unit of the power steering adjustment device according to the first embodiment of the present invention.
Figure 2B:
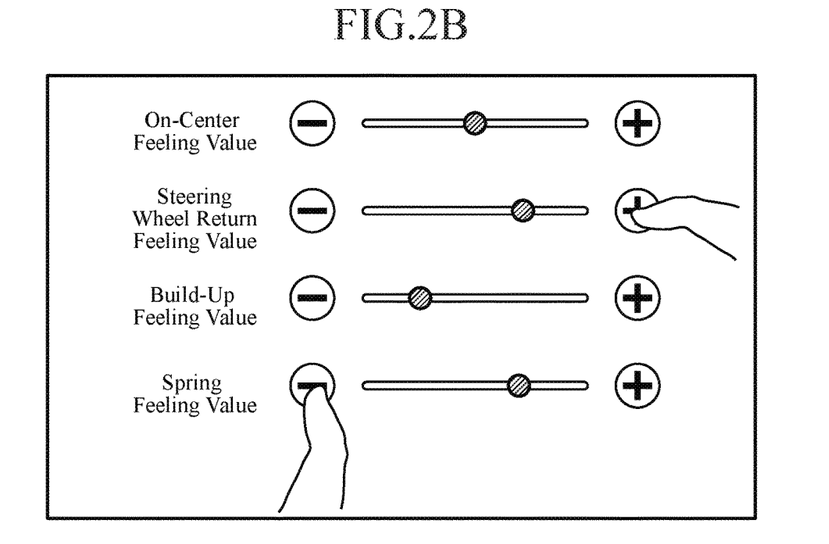
Figure 3A:
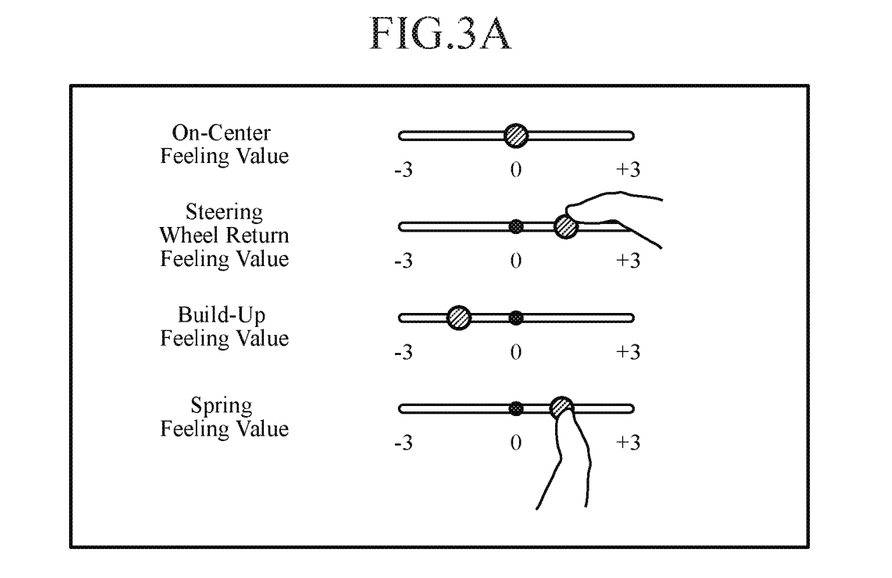
FIGS. 3A and 3B are explanatory diagrams illustrating other examples of the feeling value operation section in the adjustment information input unit of the power steering adjustment device according to the first embodiment of the present invention.
Figure 3B:
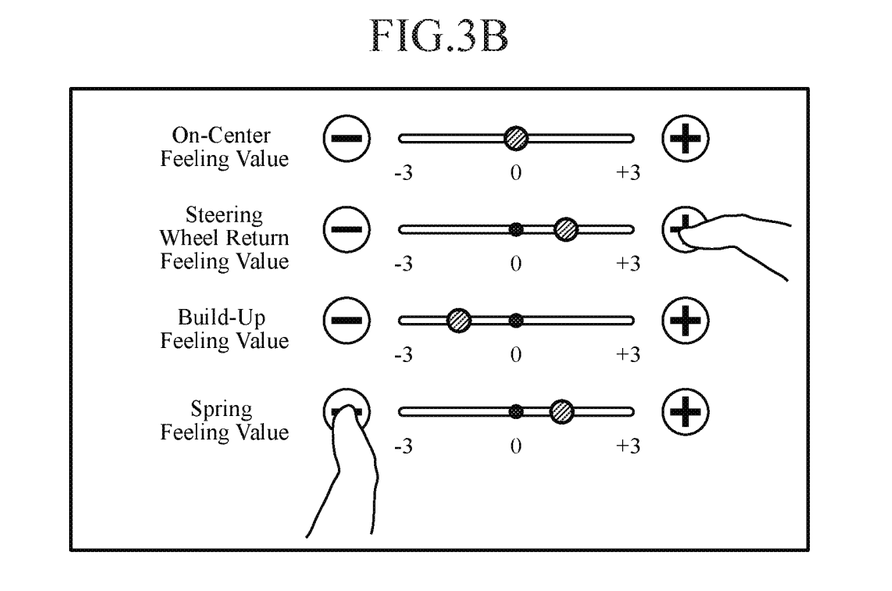

A feeling value may be directly input by an input device such as a keyboard or by touch input. Alternatively, a feeling value may be input via a sliding input on a value bar by touch operation (FIG. 2A) or may be changed by pressing on an icon (FIG. 2B). A feeling value may be displayed as a difference value while a conditions serving as a reference at each time is set to be 0 point, for example a value represented within −3 to 0 point and 0 to +3 point as illustrated in FIGS. 3A and 3B. Note that FIG. 3A is a case of changing values by sliding input and FIG. 3B is a case of changing values by pressing on icons. As a difference value from a reference of 0 point, for example, control having adjusted to a certain extent may be regarded as the reference of 0 point while an added feeling value is regarded as the difference value. Alternatively, adjustment data previously stored in repeated adjustment may be regarded as the reference of 0 point while an added feeling value is regarded as the difference value. Such a configuration enables intuitive operation of feeling values. Note that the feeling values such as the on-center feeling value will be described in detail later.

The steering control information calculation unit 2 is a processing unit that calculates data of a control characteristic graph visually representing control characteristics of steering using information acquired by the adjustment information input unit 1. The steering control information calculation unit 2 is configured to change a display range of a control characteristic graph axis in response to a vehicle speed based on vehicle information from the CAN data acquisition unit 5. Steering control information may be a single value or array data of two or three variables. In the case of two or three variables, the steering control information can be represented by a two- or three-dimensional graph. For example, representation by a graph of "steering angle and steering torque value", "reaction force received from road surface and motor compensating current", "steering torque and motor compensating current", "steering angle, steering torque value, and vehicle speed". "reaction force received from road surface, motor compensating current, and vehicle speed", or "steering toque, motor compensating current, and vehicle speed" can be used.

The adjustment information display unit 3 displays, on the same screen, a control characteristic graph formed from the data of the control characteristic graph provided by the steering control information calculation unit 2 and a feeling value operation section visually showing a feeling value. The adjustment information input unit 1 and the adjustment information display unit 3 are configured by a device having a touch panel that performs screen display and accepts input operation on the screen such as an onboard navigation device, a smartphone, and a tablet terminal, however, the adjustment information input unit 1 and the adjustment information display unit 3 may be separate devices. The display change unit 4 is a functional unit that accepts input for display change from an adjusting person and is included in the same screen of a touch panel display unit forming the adjustment information input unit 1 and the adjustment information display unit 3, for example, but may be provided as a separate button or other items. The CAN data acquisition unit 5 is a function unit for acquiring controller area network (CAN) data such as a vehicle speed or a steering angle of a steering wheel to be adjusted and outputting the data to the steering control information calculation unit 2. The CAN data acquisition unit 5 also has a function to acquire simulation data such as vehicle speed information or the angle of a steering wheel from a vehicle simulator. The steering control information output unit 6 is an interface for providing the steering control information calculated by the steering control information calculation unit 2 to a steering mechanism which is a target of power assistance such as an assist motor.

Next, operations of the first embodiment configured in the above manner will be described.

Figure 4:
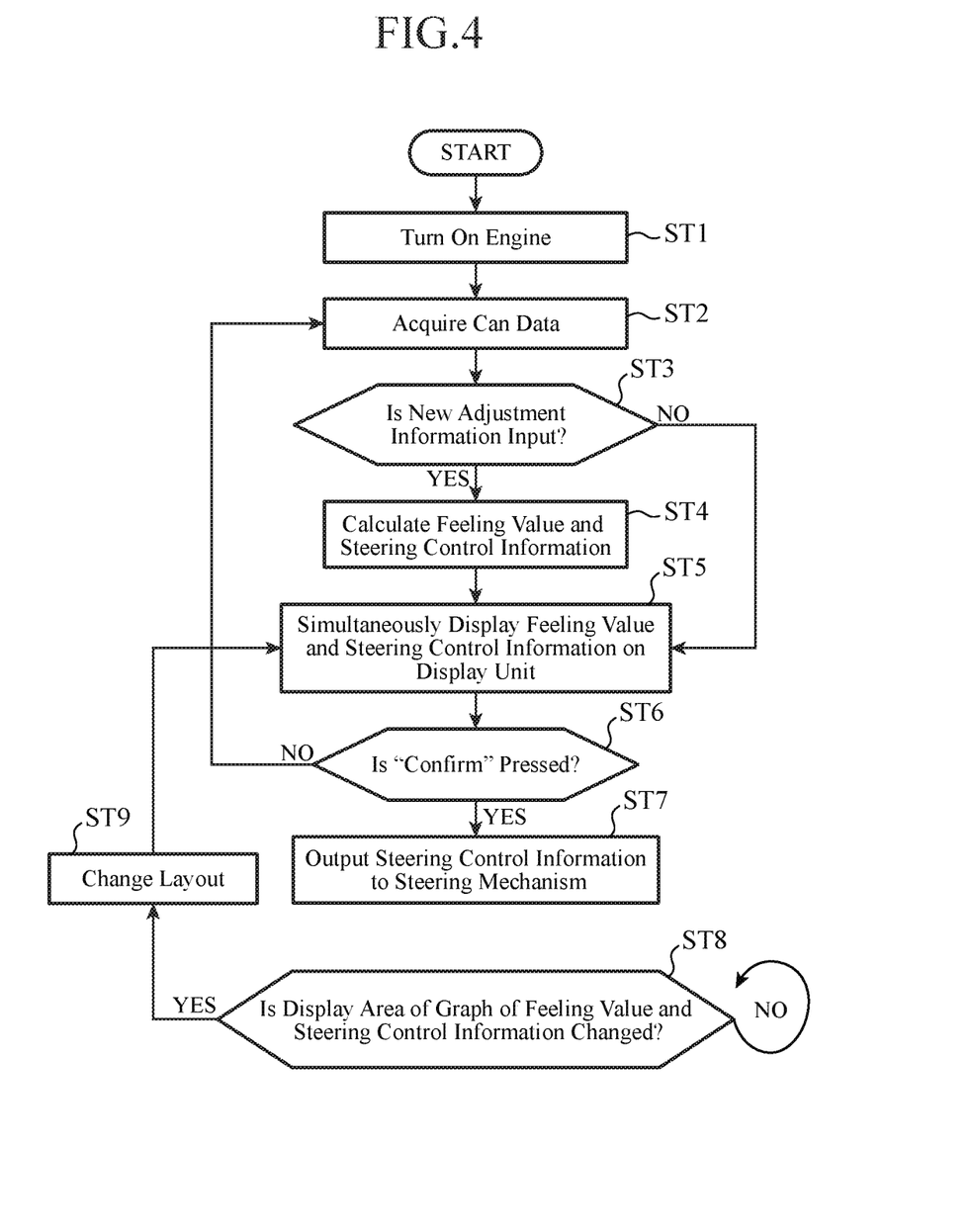
FIG. 4 is a flowchart illustrating operations of the power steering adjustment device according to the first embodiment of the present invention.

FIG. 4 is a flowchart illustrating operations of the power steering adjustment device according to the first embodiment.

First, when an engine of a vehicle is started (step ST1), in the power steering adjustment device, the CAN data acquisition unit 5 acquires CAN data (step ST2). Next, in the power steering adjustment device, the adjustment information input unit 1 determines whether new adjustment information is input (step ST3). If no new adjustment information is input, steering control information corresponding to the vehicle speed acquired in step ST2 is output to the adjustment information display unit 3. The adjustment information display unit 3 then displays, on the same screen, the steering control information acquired from the steering control information calculation unit 2 and a feeling value corresponding to the steering control information (step ST5).

Figure 5:
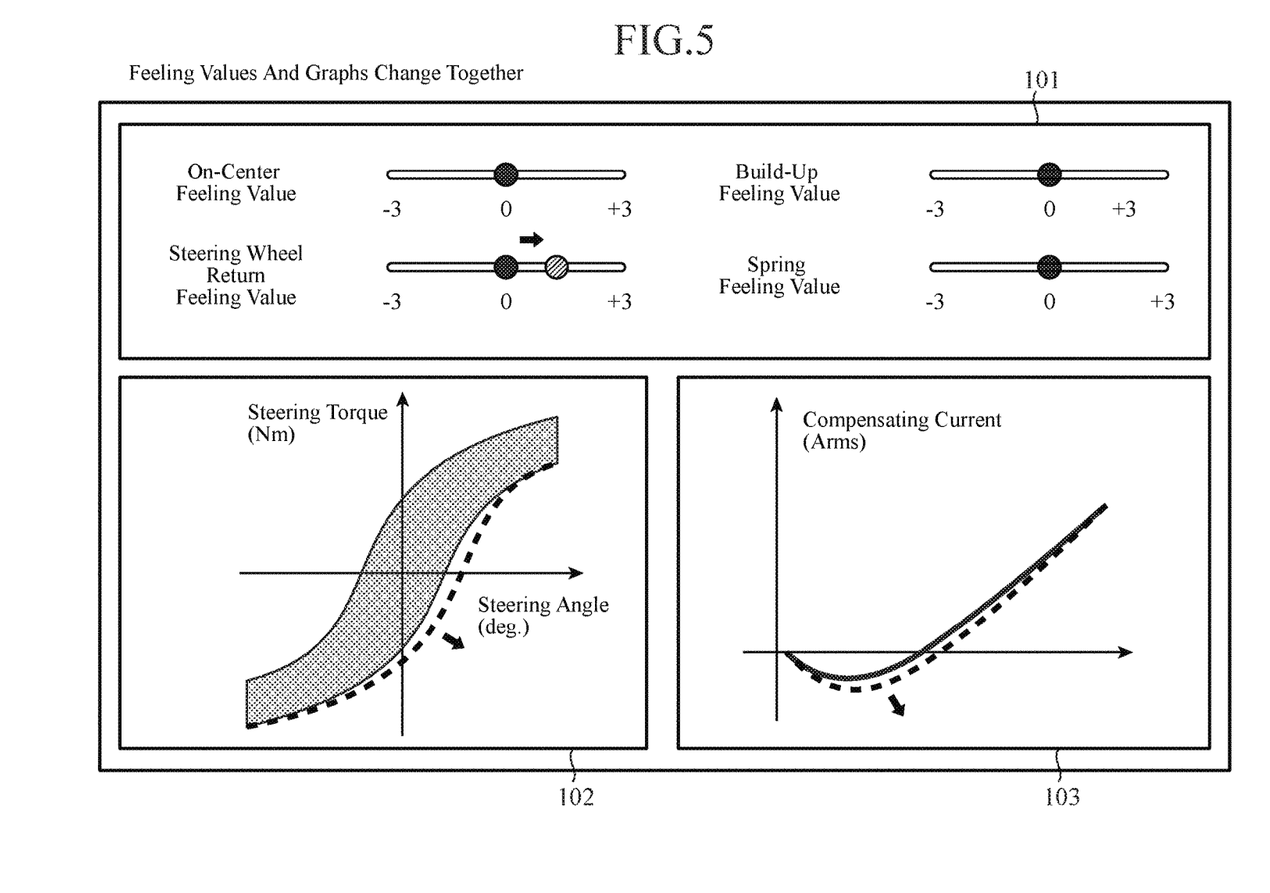
FIG. 5 is an explanatory diagram illustrating display example of feeling values and steering control information of the power steering adjustment device according to the first embodiment of the present invention.

FIG. 5 is an explanatory diagram illustrating a display example of feeling values and steering control information. As illustrated in the drawing, a feeling value operation section 101 representing four types of feeling values, a control characteristic graph 102 representing relation between the steering angle and the steering torque, and a control characteristic graph 103 representing relation between various steering parameters and a motor compensating current are displayed on the same screen.

The four types of feeling values are obtained from relation between the steering angle and the steering torque illustrated in the control characteristic graph 102 or relation between various steering parameters and the motor compensating current illustrated in the control characteristic graph 103. The respective feeling values are as follows.

On-center feeling: feeling that the steering wheel tends to stay at the steering angle of approximately 0 degree. This is correlated with the steering control information with respect to a heaviness of the steering wheel near the steering angle of 0 degree or the steering angle when the heaviness of the steering wheel becomes zero.

Steering wheel return feeling: feeling that the steering wheel tends to return to the steering angle of around 0 degree when a steering wheel is operated. This is correlated with the steering control information with respect to a heaviness of the steering wheel at a steering angle of around 60 degree at 40 km/h, for example.

Spring feeling: feeling as if a steering wheel rebounds when the steering wheel is operated at a large angle. This is correlated with the steering control information with respect to a difference in the heaviness (torque value) between increasing steering and reducing steering of the steering wheel at a steering angle of around 120 degree at 40 km/h, for example.

Build-up feeling: feeling of a change in the heaviness of the steering wheel when steering from a large angle to a steering angle of approximately 0 degree. This is correlated with the steering control information with respect to a change amount of the heaviness of the steering wheel about a steering angle of 0 to 120 degrees at 40 km/h, for example.

The control characteristic graph 102 representing relation between the steering angle and the steering torque integratedly shows the values of the control characteristic graphs 103 that represent relation between various parameters and a motor compensating current such as "relation between reaction force received from a road surface and a motor compensating current" and "relation between steering torque and a motor compensating current". That is, the control characteristic graph 102 represents values integrating the plurality of control characteristic graphs 103 which are based on sensibility of specialists experienced in driving. An adjusting person who is not a specialist can also perform adjustment by performing adjustment while checking feeling values, since the feeling values are obtained from the relation between the steering angle and the steering torque shown in the control characteristic graph 102.

Next, a case where new adjustment information is input to the adjustment information input unit 1 in step ST3 will be described. For example, as illustrated by an arrow in the feeling value operation section 101 in FIG. 5, when the steering wheel return feeling value is operated in a positive direction, the steering control information calculation unit 2 calculates a value of steering control information corresponding to the operation (step ST4). As a result of this, the adjustment information display unit 3 displays, on the same screen, the operated feeling value operation section 101 as well as the steering control information calculated by the steering control information calculation unit 2, for example in the case of FIG. 5, the control characteristic graph 102 representing relation between a new steering angle and steering torque as illustrated in a broken line and the control characteristic graph 103 representing relation between various parameters and a motor compensating current (step ST5).

Figure 6A:
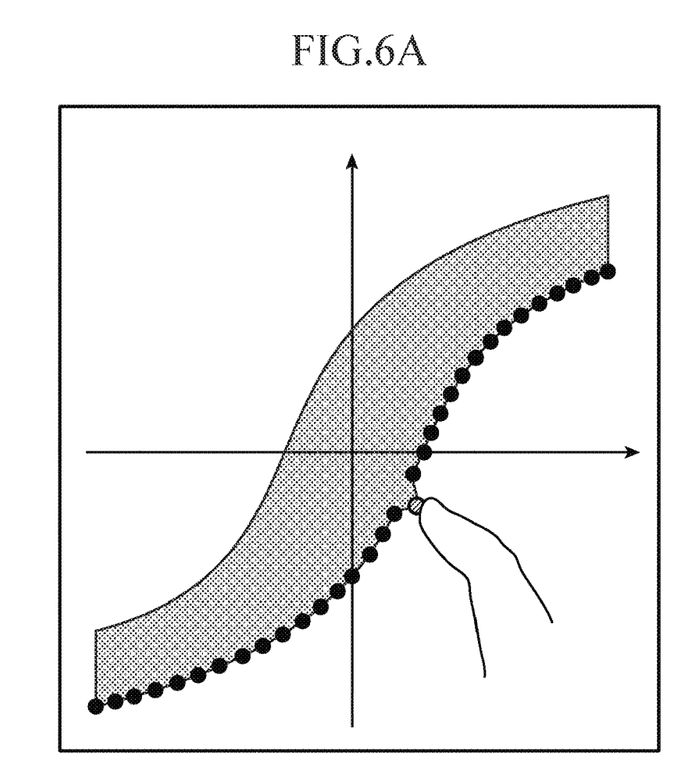
FIGS. 6A and 6B are explanatory diagrams illustrating adjusting input of the power steering adjustment device according to the first embodiment of the present invention.
Figure 6B:
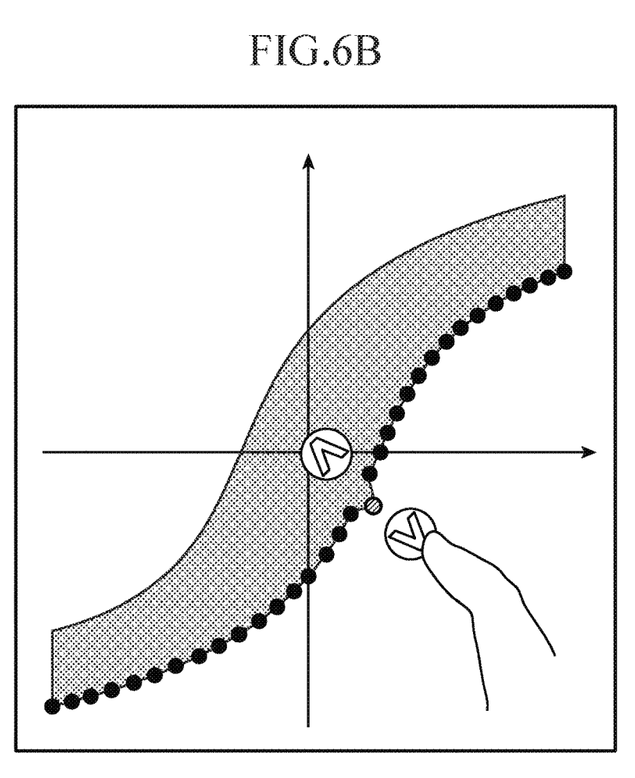

Moreover, input of adjustment information may be performed not only from the feeling value operation section 101 but also by operating the control characteristic graph 102 representing relation between the steering angle and the steering torque or a control characteristic graph 103 representing relation between various steering parameters and the motor compensating current. For example, FIG. 6A is a diagram illustrating an example of editing the control characteristic graph 102 by sliding operation. A black dot in the drawing is an edit point. Sliding operation of this dot results in performing adjusting input. FIG. 6B is an example of adjusting input by touching an icon. In this case, icons representing adjusting directions are displayed. Touching any one of the icons results in editing the graph to perform adjusting input.

Also in the case of adjusting input to the control characteristic graph 102 illustrated in FIGS. 6A and 6B or adjusting input to the control characteristic graph 103, the steering control information calculation unit 2 calculates feeling values and steering control information corresponding to the adjusting input and outputs them to the adjustment information display unit 3. As a result of this, regardless of which one of the feeling value operation section 101, the control characteristic graph 102, and the control characteristic graph 103 is used for performing adjusting input, it is possible for the feeling values and the steering control information to be changed together.

Next, when confirming operation is performed on a display content displayed by the adjustment information display unit 3 such as pressing on a confirmation button (not illustrated) (step ST6), the steering control information calculation unit 2 outputs the steering control information to the steering mechanism (step ST7).

Figure 7A:
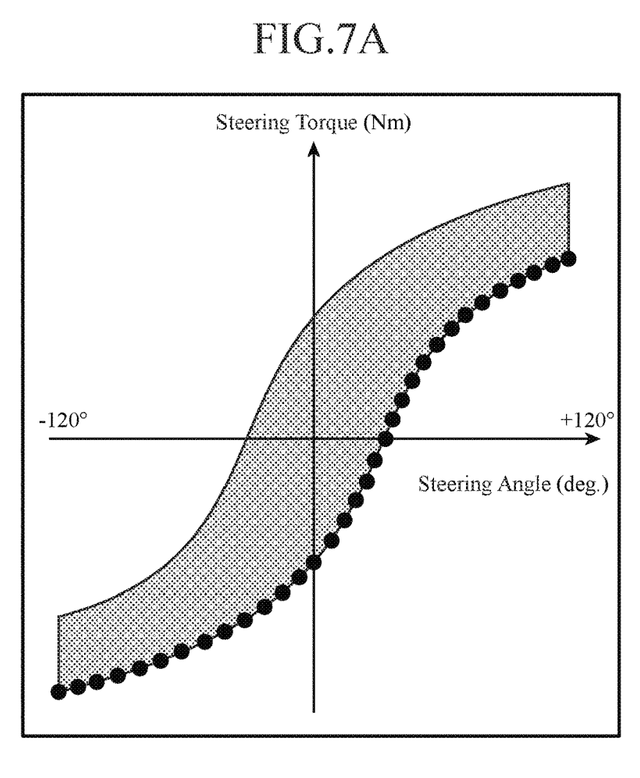
FIGS. 7A and 7B are explanatory diagrams illustrating a graph of the steering angle corresponding to the vehicle speed of the power steering adjustment device according to the first embodiment of the present invention.
Figure 7B:
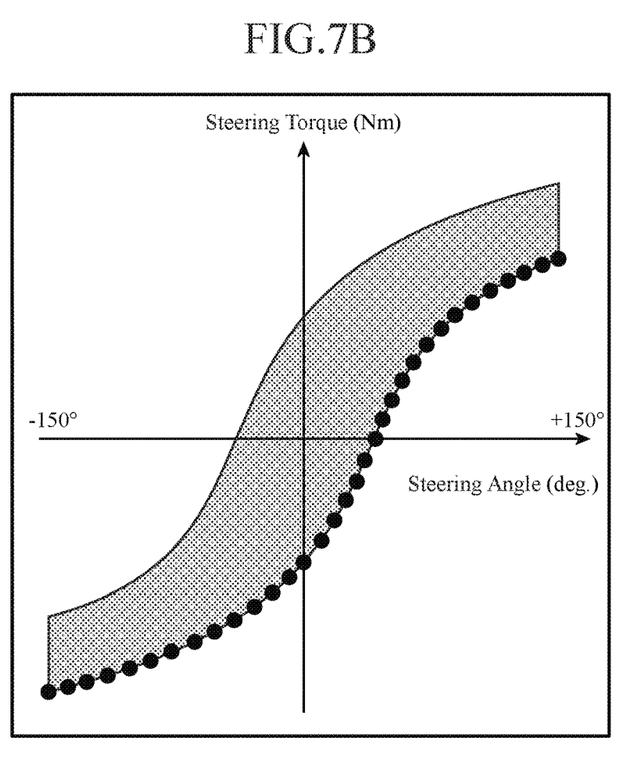

On the other hand, if confirming operation is not performed in step ST6, the flow returns to step ST2 and CAN data is acquired and, in step ST5, display is performed in response to the vehicle speed. For example, FIGS. 7A and 7B are diagrams illustrating change, in accordance with the vehicle speed, in the control characteristic graph 102 representing relation between the steering angle and the steering torque. FIG. 7A is a case where the vehicle speed is 40 km/h, in which the steering angle is displayed within −120 to 120 degrees. On the other hand, FIG. 7B is a case where the vehicle speed is 20 km/h, in which the steering angle is displayed within −150 to 150 degrees.

Figure 8:
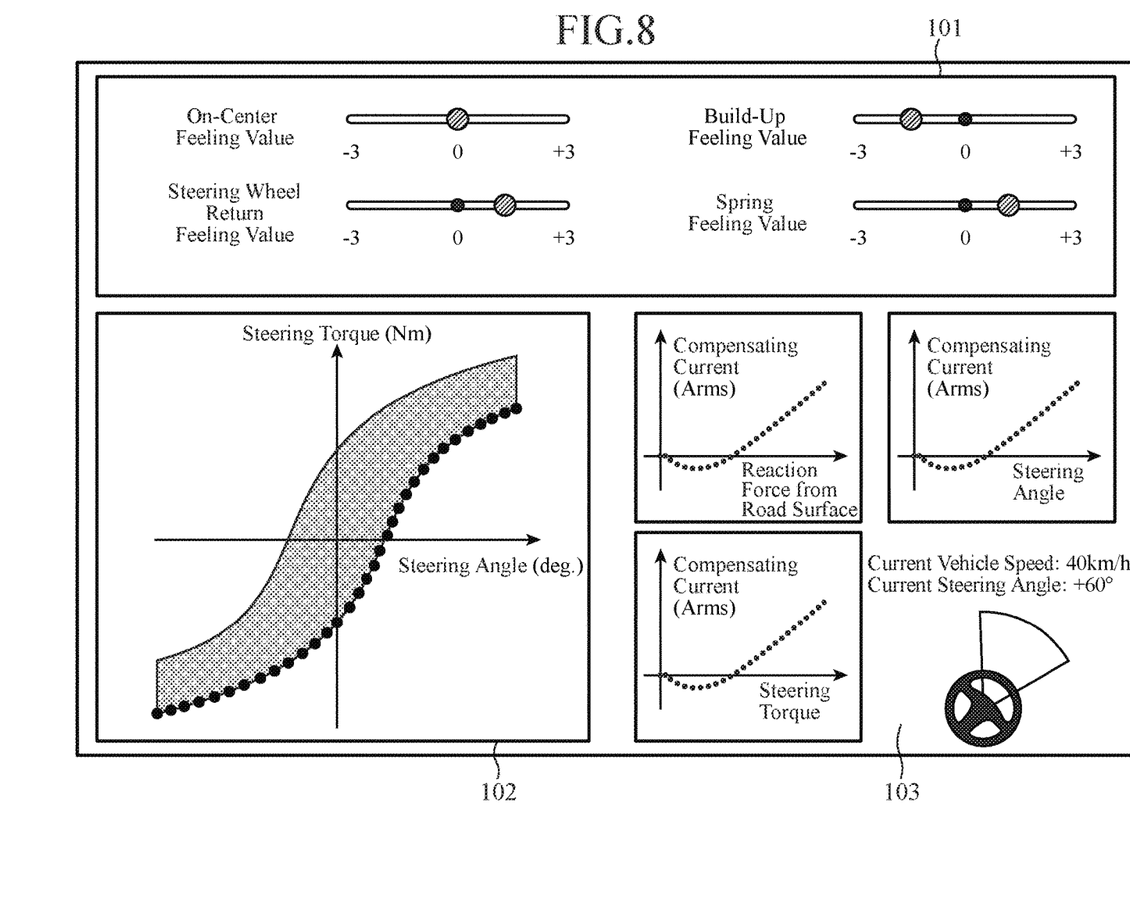
FIG. 8 is an explanatory diagram illustrating a first layout example of the power steering adjustment device according to the first embodiment of the present invention.
Figure 9:
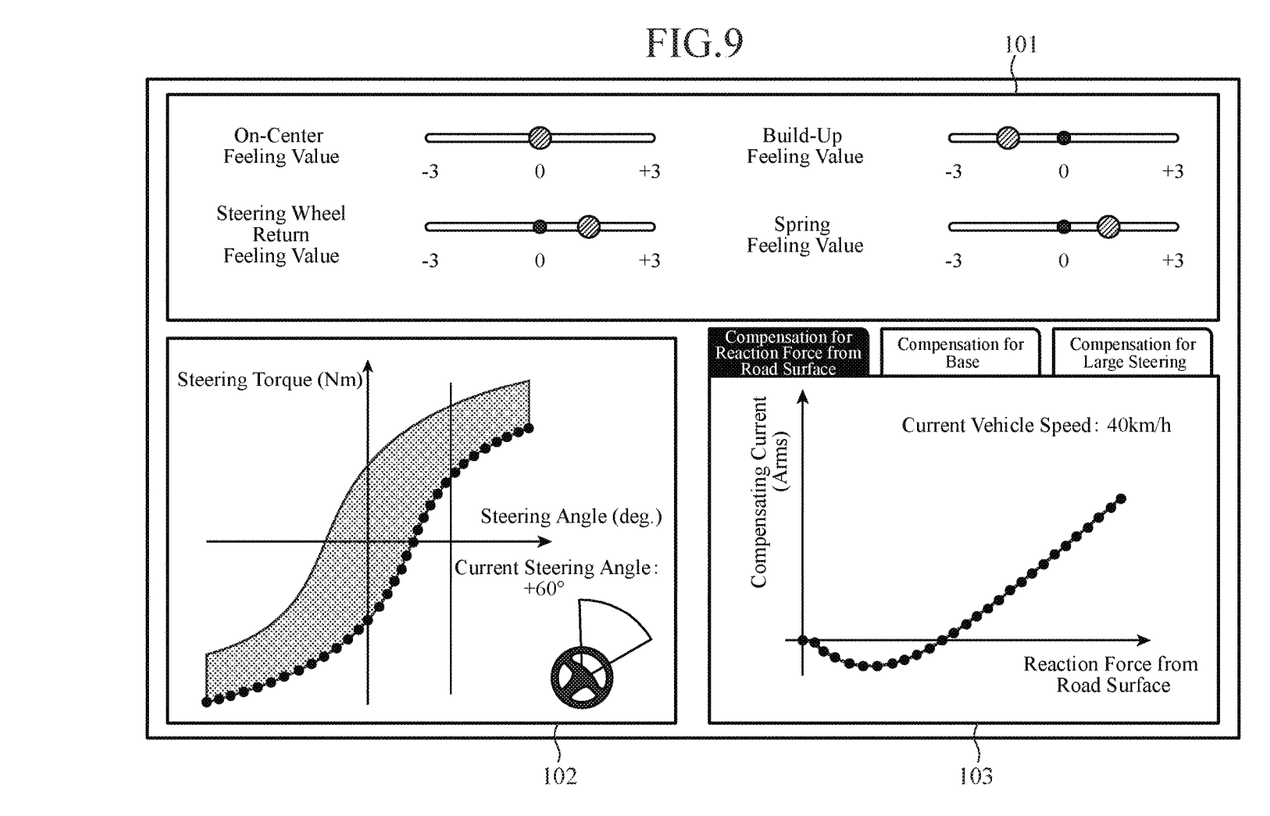
FIG. 9 is an explanatory diagram illustrating a second layout example of the power steering adjustment device according to the first embodiment of the present invention.
Figure 10:
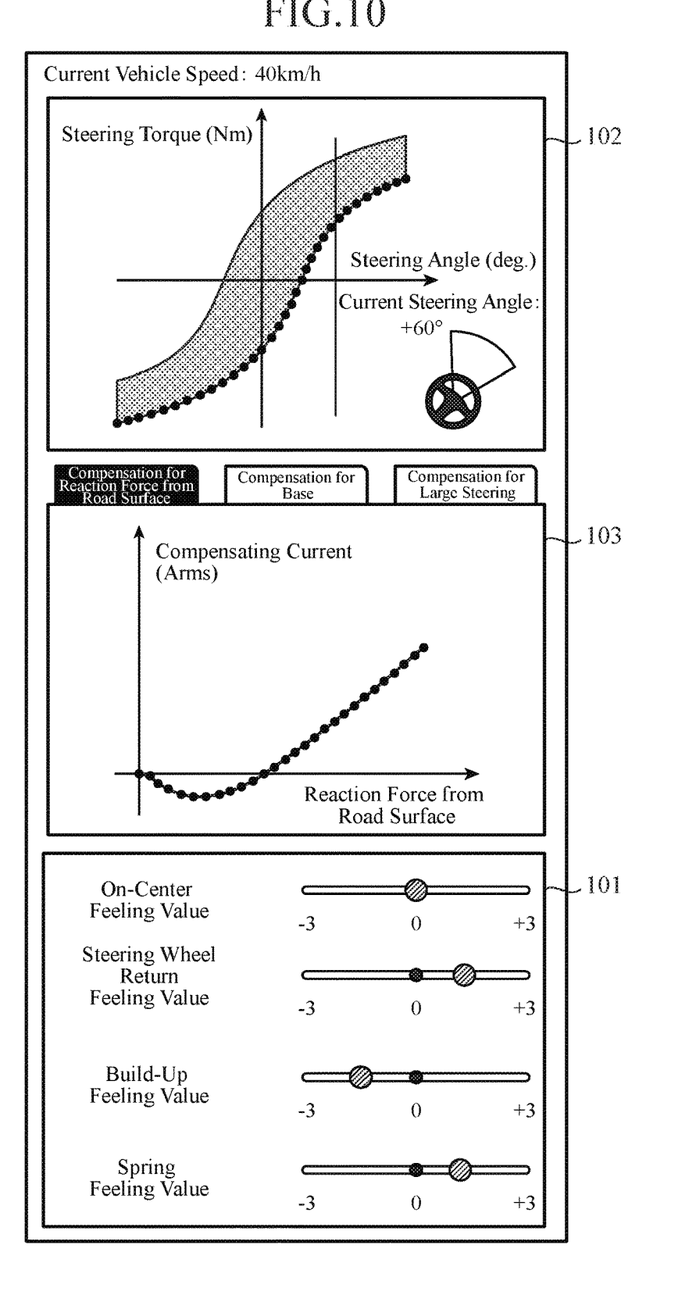
FIG. 10 is an explanatory diagram illustrating a third layout example of the power steering adjustment device according to the first embodiment of the present invention.

Next, display change operation performed by the display change unit 4 will be described. When a display change operation is performed in step ST8, the adjustment information display unit 3 changes layout (step ST9) and returns to the processing of step ST5. FIGS. 8 to 10 are explanatory diagrams illustrating layout examples. FIG. 8 is a case where the adjustment information display unit 3 is a laterally long display and the feeling value operation section 101 is displayed in an upper part. FIG. 9 is an example where control characteristic graphs 103 representing relation between various parameters and a motor compensating current are switched by tabs. FIG. 10 is a display suitable for a vertically long display. The control characteristic graph 102 representing relation between the steering angle and the steering torque is arranged in an upper part, and the feeling value operation section 101 is arranged in a lower part.

The display change operation performed by the display change unit 4 may be manual input by an adjusting person or may be automatic change in accordance with the direction of the screen using an accelerator sensor. Alternatively, the layout may be switched in accordance with the size of the screen or other conditions. Further, display may be performed to display information considered as important under the current circumstances at a position easily viewed. For example, the feeling value operation section 101 is displayed in an upper part when the vehicle is stopped, and the control characteristic graph 102 representing relation between the steering angle and the steering torque is displayed in an upper part when the vehicle is traveling. Moreover, it is possible to change display such that only the feeling value operation section 101 and the control characteristic graph 102 representing relation between the steering angle and the steering torque are displayed and the control characteristic graph 103 representing relation between various steering parameters and the motor compensating current is not displayed.

The operation described above may be performed not only when the vehicle is actually traveling but also when the vehicle is stopped by acquiring simulation data via the CAN data acquisition unit 5. This allows an adjusting person to confirm, as prediction values, how a feeling value, relation between the steering angle and the steering torque, and relation between various parameters and the motor compensating current change without actually driving the vehicle.

As described above, the power steering adjustment device according to the first embodiment includes: an adjustment information input unit acquiring at least one of information of a feeling value representing steering feeling of a steering wheel of a vehicle and steering control information representing control information of assist power of steering; a steering control information calculation unit calculating data of at least one control characteristic graph visually representing control characteristics of steering using the at least one of information acquired by the adjustment information input unit; and an adjustment information display unit displaying the at least one control characteristic graph in accordance with the data of the at least one control characteristic graph and a feeling value operation section visually showing the feeling value on the same screen. Therefore, a person not skilled in adjustment work can also perform adjustment, and the time for adjustment can be reduced.

According to the power steering adjustment device of the first embodiment, when one of information of a feeling value and steering control information is input, the steering control information calculation unit calculates the other information to be linked to the input information, and the adjustment information display unit displays a value of the input information and a value of the other information. Therefore, it is easy to check correlation between feeling values and steering control information.

According to the power steering adjustment device of the first embodiment, there is a plurality of control characteristic graphs, and a display change unit for acquiring change input of layout display of the plurality of control characteristic graphs and the feeling value operation section is included. When the display change unit acquires change input of layout display, the adjustment information display unit displays the plurality of control characteristic graphs and the feeling value operation section in the layout display in accordance with the change input. As a result, the display layout of the feeling value operation section and the control characteristic graphs can be flexibly changed, and the operability of adjustment work can be improved.

According to the power steering adjustment device of the first embodiment, the steering control information calculation unit is configured to change a display range of a control characteristic graph axis in response to a vehicle speed. Therefore, optimum display can be performed in accordance with the vehicle speed, and the operability of adjustment work can be improved.

According to the power steering adjustment device of the first embodiment, the feeling value operation section is configured to accept input of each feeling values by a sliding input to a value bar. Therefore, adjustment of feeling values can be intuitively performed, thereby enhancing operability of adjustment work.

According to the power steering adjustment device of the first embodiment, the feeling value operation section is configured to accept input of a difference from a reference value of 0. Therefore, adjustment of a feeling value can be easily performed.

According to the power steering adjustment device of the first embodiment, feeling values are obtained from relation between the steering angle and the steering torque defined in the steering control information. Therefore, adjustment work can be easily performed, and the time for adjustment can be reduced.

According to the power steering adjustment device of the first embodiment, feeling values are obtained from relation between steering parameters and a motor compensating current of a motor that assists steering. Therefore, adjustment work can be easily performed, and the time for adjustment can be reduced.

Note that, within the scope of the present invention, it is possible to modify or omit any component of the respective embodiments.

INDUSTRIAL APPLICABILITY

As described above, a power steering adjustment device according to the present invention relates to a configuration for adjustment support upon performing adjustment of steering control of a vehicle and thus is suitable for use in adjustment of steering control when a vehicle is developed or a driver desires to change steering characteristics.

REFERENCE SIGNS LIST

1: Adjustment information input unit, 2: Steering control information calculation unit, 3: Adjustment information display unit, 4: Display change unit, 5: CAN data acquisition unit, 6: Steering control information output unit

The invention claimed is:
1. A power steering adjustment device comprising:
an adjustment information inputter acquiring at least one of information of a feeling value representing steering feeling of a steering wheel of a vehicle and steering control information representing control information of assist power of steering;
a steering control information calculator calculating data of at least one control characteristic graph visually representing control characteristics of steering using the at least one of information acquired by the adjustment information inputter; and
an adjustment information display displaying the at least one control characteristic graph in accordance with the data of the at least one control characteristic graph and a feeling value operation section visually showing the feeling value on a same screen,
wherein the feeling value is obtained from relation between a steering angle and steering torque in the steering control information.

2. The power steering adjustment device according to claim 1, wherein, when one of information of the feeling value and the steering control information is input as input information, the steering control information calculator calculates another information to be linked to the input information, and
   the adjustment information display displays a value of the input information and a value of the other information.

3. The power steering adjustment device according to claim 1,
   wherein the at least one control characteristic graph is a plurality of control characteristic graphs,
   the power steering adjustment device further comprises a display changer acquiring change input of layout display of the plurality of control characteristic graphs and the feeling value operation section, and
   when the display changer acquires the change input of the layout display, the adjustment information display displays the plurality of control characteristic graphs and the feeling value operation section in the layout display in accordance with the change input.

4. The power steering adjustment device according to claim 1,
   wherein the steering control information calculator changes a display range of a control characteristic graph axis in response to a vehicle speed.

5. The power steering adjustment device according to claim 1,
   wherein the feeling value operation section accepts an input of the feeling value via a sliding input on a value bar.

6. The power steering adjustment device according to claim 5,
   wherein the feeling value operation section accepts an input of the feeling value as a difference from a reference value set to be 0.

7. The power steering adjustment device comprising:
   an adjustment information inputter acquiring at least one of information of a feeling value representing steering feeling of a steering wheel of a vehicle and steering control information representing control information of assist power of steering;
   a steering control information calculator calculating data of at least one control characteristic graph visually representing control characteristics of steering using the at least one of information acquired by the adjustment information inputter; and
   an adjustment information display displaying the at least one control characteristic graph in accordance with the data of the at least one control characteristic graph and a feeling value operation section visually showing the feeling value on a same screen,
   wherein the feeling value is obtained from relation between a steering parameter and a motor compensating current of a motor that assists steering.

* * * * *